United States Patent
Srivastava et al.

(10) Patent No.: US 10,411,969 B2
(45) Date of Patent: Sep. 10, 2019

(54) BACKEND RESOURCE COSTS FOR ONLINE SERVICE OFFERINGS

(71) Applicant: Microsoft Technology Licensing, LLC, Redmond, WA (US)

(72) Inventors: Shantanu Srivastava, Bothell, WA (US); Andres Cuitlahuac Paz Sampedro, Bellevue, WA (US); Atin Atul Kothari, Bellevue, WA (US); Andre Fayeofori Briggs, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 235 days.

(21) Appl. No.: 15/284,299

(22) Filed: Oct. 3, 2016

(65) Prior Publication Data
US 2018/0097705 A1 Apr. 5, 2018

(51) Int. Cl.
*H04L 12/24* (2006.01)
*H04L 12/26* (2006.01)
*H04L 29/08* (2006.01)

(52) U.S. Cl.
CPC .......... *H04L 41/147* (2013.01); *H04L 41/142* (2013.01); *H04L 41/5038* (2013.01);
(Continued)

(58) Field of Classification Search
CPC . H04L 41/142; H04L 41/147; H04L 41/5019; H04L 41/5041; H04L 67/10;
(Continued)

(56) References Cited

U.S. PATENT DOCUMENTS

| 6,526,025 B1 * | 2/2003 | Pack ..................... H04L 41/147 370/252 |
| 7,324,968 B2 | 1/2008 | Rotman et al. |

(Continued)

FOREIGN PATENT DOCUMENTS

| CA | 2885102 A1 * | 3/2014 | ............. G06Q 50/06 |
| CN | 101131754 A * | 2/2008 | |

(Continued)

OTHER PUBLICATIONS

Reinartz, et al., "How to Sell ServicesMore Profitably", Published on: May 2008 Available at: https://hbr.org/2008/05/how-to-sell-services-more-profitably.
(Continued)

*Primary Examiner* — Kostas J Katsikis
(74) *Attorney, Agent, or Firm* — Jeffrey L. Ranck; Ranck IP Law

(57) ABSTRACT

Representative embodiments disclose mechanisms to calculate resource costs (e.g., processing, memory, storage and/or monetary costs) to provide an online service. The service is offered by a service provider that provides a plurality of different online services. To identify systems involved in providing a particular service, each request is associated with a unique identifier. The identifier is passed between systems and logged. Thus a trace of the unique identifier yields all systems involved in providing the service. A maximum operational load, calculated from operational data, is used to calculate a cost per request. A statistical sampling of the logged data is retrieved and the cost for each request in the sample is calculated based on a sum of the costs of the systems used to service the request. The cost of each system is the cost per request times the number of times the system is used to fill the request.

18 Claims, 9 Drawing Sheets

(52) U.S. Cl.
CPC .......... *H04L 43/08* (2013.01); *H04L 41/5019* (2013.01); *H04L 43/0852* (2013.01); *H04L 43/0882* (2013.01); *H04L 67/10* (2013.01)

(58) Field of Classification Search
CPC . H04L 41/5038; H04L 43/08; H04L 43/0852; H04L 43/0882
See application file for complete search history.

(56) References Cited

U.S. PATENT DOCUMENTS

| | | | |
|---|---|---|---|
| 7,797,170 B2 | 9/2010 | Bodin | |
| 8,126,751 B2 | 2/2012 | Mekyska | |
| 8,386,540 B1* | 2/2013 | McAlister | G06F 16/256 707/899 |
| 8,825,002 B2 | 9/2014 | Meyer et al. | |
| 9,197,739 B1* | 11/2015 | Shani | H04L 41/5025 |
| 9,390,390 B1* | 7/2016 | Wertheimer | G06Q 10/06313 |
| 9,722,945 B2* | 8/2017 | Siciliano | G06F 9/505 |
| 9,800,480 B1* | 10/2017 | Eichler | H04L 43/50 |
| 9,953,351 B1* | 4/2018 | Sivasubramanian | G06Q 30/0283 |
| 10,191,778 B1* | 1/2019 | Yang | G06F 9/5055 |
| 2004/0243699 A1* | 12/2004 | Koclanes | H04L 29/06 709/224 |
| 2005/0246189 A1 | 11/2005 | Monitzer et al. | |
| 2005/0273507 A1* | 12/2005 | Yan | H04L 41/0896 709/223 |
| 2007/0094381 A1* | 4/2007 | Weiss | H04L 41/0806 709/224 |
| 2007/0193303 A1* | 8/2007 | Hawrysz | F25J 1/0242 62/612 |
| 2010/0076863 A1 | 3/2010 | Golomb | |
| 2012/0041899 A1 | 2/2012 | Greene et al. | |
| 2012/0115433 A1* | 5/2012 | Young | H04L 41/5029 455/406 |
| 2012/0131591 A1* | 5/2012 | Moorthi | G06Q 10/06 718/104 |
| 2012/0317085 A1* | 12/2012 | Green | G06F 16/9535 707/704 |
| 2012/0323641 A1* | 12/2012 | Chu | G06Q 10/063 705/7.39 |
| 2013/0041644 A1* | 2/2013 | Cremonesi | G06Q 10/06 703/13 |
| 2013/0073732 A1* | 3/2013 | Vicat-Blanc-Primet | H04L 41/0893 709/226 |
| 2013/0091180 A1* | 4/2013 | Vicat-Blanc-Primet | H04L 41/0816 707/803 |
| 2013/0103785 A1* | 4/2013 | Lyon | H04N 21/2385 709/217 |
| 2013/0227116 A1* | 8/2013 | Radhakrishnan | H04L 41/0823 709/224 |
| 2014/0089511 A1* | 3/2014 | McLean | G06F 9/5061 709/226 |
| 2014/0279201 A1* | 9/2014 | Iyoob | G06Q 30/0631 705/26.7 |
| 2014/0310249 A1* | 10/2014 | Kowalski | G06F 17/30289 707/688 |
| 2015/0052247 A1* | 2/2015 | Threefoot | H04L 67/10 709/225 |
| 2015/0074667 A1* | 3/2015 | Araki | G06F 9/543 718/100 |
| 2015/0156065 A1* | 6/2015 | Grandhe | H04L 41/5054 709/224 |
| 2015/0222723 A1* | 8/2015 | Adapalli | H04L 67/2809 705/26.41 |
| 2015/0278061 A1* | 10/2015 | Siciliano | H04L 47/762 702/186 |
| 2015/0281117 A1* | 10/2015 | Kunde | H04L 41/5019 709/226 |
| 2015/0304230 A1* | 10/2015 | Suparna | G06F 9/5072 709/224 |
| 2015/0312127 A1* | 10/2015 | Leemet | H04L 41/5032 709/224 |
| 2015/0312421 A1* | 10/2015 | Leemet | H04W 4/70 379/114.03 |
| 2015/0312422 A1* | 10/2015 | Leemet | H04L 41/082 455/406 |
| 2015/0341240 A1* | 11/2015 | Iyoob | H04L 43/08 709/201 |
| 2016/0044182 A1* | 2/2016 | Leemet | H04W 4/70 455/406 |
| 2016/0065417 A1* | 3/2016 | Sapuram | G06Q 30/0631 709/223 |
| 2016/0203528 A1* | 7/2016 | Saha | G06Q 30/04 705/34 |
| 2016/0330083 A1* | 11/2016 | Djukic | H04L 41/5006 |
| 2017/0142452 A1* | 5/2017 | Bae | H04N 19/507 |
| 2017/0149880 A1* | 5/2017 | Lochhead | G06F 9/00 |
| 2017/0332273 A1* | 11/2017 | Link, II | H04W 76/11 |
| 2017/0339013 A1* | 11/2017 | Allen | H04L 41/046 |
| 2017/0372384 A1* | 12/2017 | Yaros | G06Q 30/0283 |
| 2018/0077049 A1* | 3/2018 | Paul | H04L 45/125 |
| 2018/0082088 A1* | 3/2018 | Sehmer | G06K 7/10009 |

FOREIGN PATENT DOCUMENTS

| | | | |
|---|---|---|---|
| CN | 102722831 A | * | 10/2012 |
| CN | 104392294 A | * | 3/2015 |

OTHER PUBLICATIONS

"Infonova: Product Overview", Retrieved on: Jul. 22, 2016 Available at: https://www.infonova.com/pdf/Product_Overview_Infonova_R6.pdf.

Joshi, et al., "Cost-to-Serve Analysis: A Business Imperative for CPG Manufacturers", In White Paper of TATA Consultancy Services, Sep. 6, 2015, pp. 1-13.

* cited by examiner

BACKEND RESOURCE COSTS FOR ONLINE SERVICE OFFERINGS

FIELD

This application relates generally to online services. More specifically, embodiments disclosed herein collect data from backend systems used to provide online service offerings and from the data calculate backend resource costs of the different service offerings.

BACKGROUND

Online services typically provide a variety of different service offerings. For example, an internet search service can provide the service of searching web pages, videos, images, products for sale, news, maps, and so forth. Each of these different services can utilize different physical and/or virtual systems, databases, networks, data centers, and so forth (collectively backend resources). Thus, a request to search videos may use some, but not all, of the backend resources used by a request to search images. Furthermore, various aspects in a request to access one or more services can change the backend resources utilized. Given the number and scope of backend resources used to provide a collection of such services, it can become difficult to ascertain the backend resource costs to offer a particular service.

Because of the difficulty of ascertaining backend resource costs to offer a particular service, it can become very difficult to identify when capacities for different services should be upgraded, how monetary costs should be allocated between services, how many backend resources a particular service offering consumes and other such capacity planning questions.

It is within this context that the present embodiments arise.

DETAILED DESCRIPTION

Figure 1:
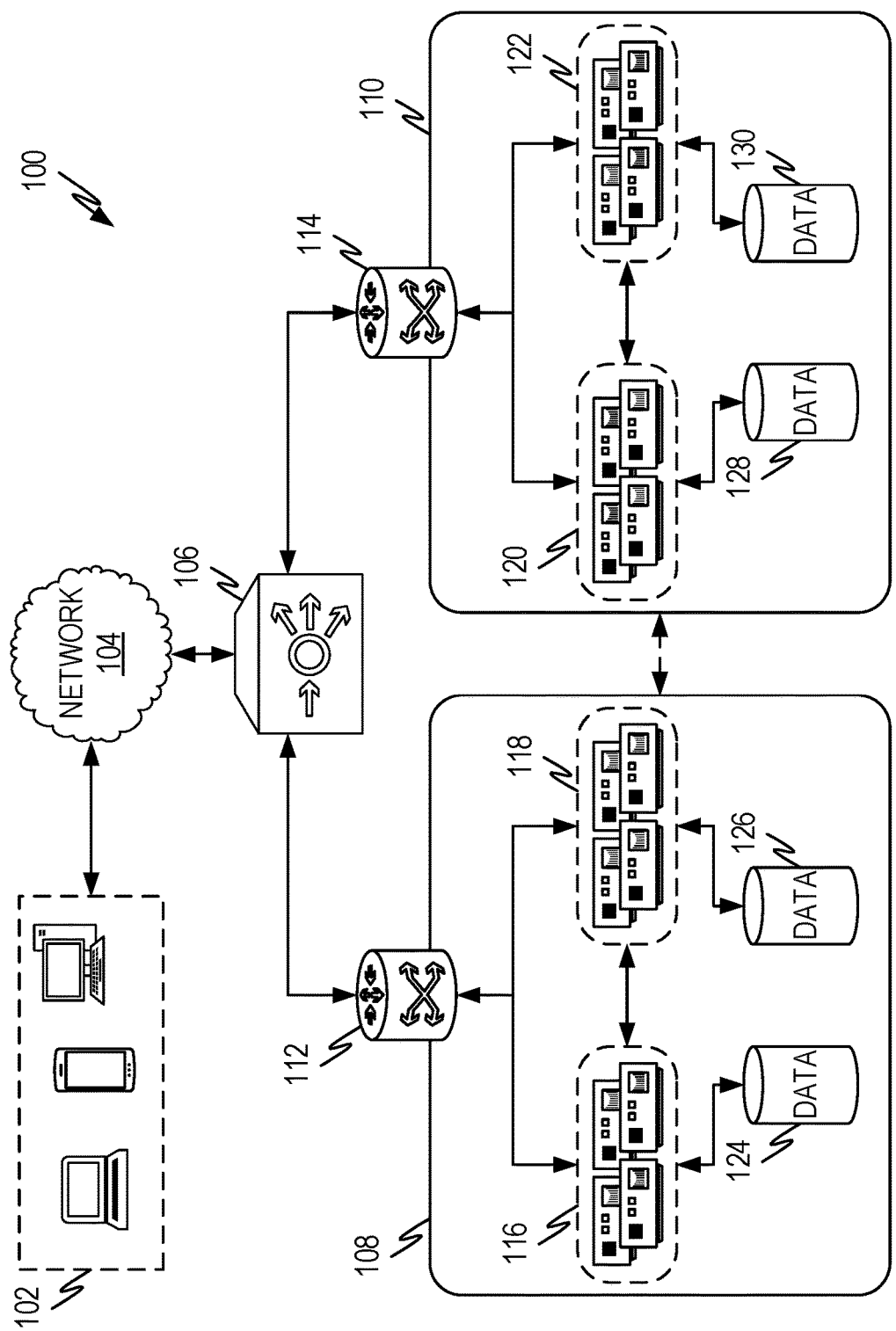
FIG. 1 illustrates an example architecture of a system to provide multiple service offerings.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Online services typically provide a variety of different service offerings. For example, an internet search service can provide the service of searching web pages, videos, images, products for sale, news, maps, and so forth. In this disclosure, each of these different service offerings will be referred to as a service. Thus, in the above example, although each of the different offerings is in the form of a search service, when different offerings use different backend resources, they are a different service. Thus, a search for a place on a map originating in the US may use different backend resources than a search for news articles originating in Europe. For convenience, some service providers may treat common service types as a single service at a high level. For example, some service providers may treat a search for images as the same service independent of whether it originates in South America or Australia. In these examples, however, the costs of the service may be broken down by origination location, as explained below.

The infrastructure to support an online service with numerous service offerings can be large and diverse, both in terms of the type of resources used and in geographic location. For example, in the example search service above, numerous data centers can reside in diverse geographic locations. Each data center can comprise numerous systems (both physical and virtual) of different types performing different functions in order to deliver the desired services.

The large and diverse infrastructure can make determining backend costs associated with the various service offerings very difficult. Embodiments disclosed herein utilize a novel approach to identifying backend costs for different service offerings. In the context of this disclosure, backend resource costs include any measure that is desired. For example, backend resource costs can include a monetary cost, a processing cost (like CPU cycles or some other processing metric), a memory cost, a storage cost, or any other metric, and/or combinations thereof.

Embodiments gather metrics on load and latency and/or utilization from systems operating in a production environment. The metrics are then used to fit a curve to the collected data points. This results in a load vs. latency curve or a load vs. utilization curve. From the load vs. latency and/or load vs. utilization curve, the system projects a maximum operational load for the system. This is the maximum load that a system should have and still be able to meet the service level agreements (SLA) for the service offering. Utilization can be machine utilization, resource utilization (I/O, network bandwidth, RAM, processing cycles, etc.). Calculating the maximum load in this manner eliminates the need to run "stress tests" on the system to identify where how the system performs under increasing loads.

The maximum operational load represents the maximum number of requests that can be serviced per year (or per another time period) without exceeding the SLA. The cost per request for a system can be calculated by dividing the total cost of the system by the maximum operational load.

As requests are received, each request is assigned a unique identifier. As the request is fulfilled, this identifier is passed among the systems that are used to fulfill the request. Each system logs the request identifier and the service associated with the request (i.e., the service the request is asking to access such as an image search, a video search, etc.). This makes it possible to identify each system involved in fulfilling a particular request for a particular service.

To calculate the backend resource costs, embodiments of the disclosure use a statistical sampling of the system log. For each sample, the particular service associated with the request is identified and the different systems used to fulfill the request are identified. For each system in the list, the number of times the system is used in filling the request is calculated. The cost per request (calculated above) for that system is then multiplied by the number of times that system is used in fulfilling the request. A sum over all the system gives the total cost for that request. Statistics on the cost for a service (mean, standard deviation, median, etc.) can then be calculated using the individual costs for each request in the statistical sampling. Costs can be broken down over several dimensions if desired to give a breakdown of the various backend resource costs for requests.

The costs can be used for a variety of purposes, such as capacity planning, monetary cost estimation, and so forth.

Description

FIG. 1 illustrates an example architecture 100 of a system to provide multiple service offerings. Requests to access one of the service offerings (hereafter referred to as just a service) are generated from a variety of sources 102. Depending on the type of service, the request can come from a user using any type of device, from another service, from a program, application, or other entity, and so forth. The request is typically transferred over a network 104 to a load balancing system 106 which determines where to route the request in order to have it fulfilled. The load balancing system 106 can be a single system or multiple systems and typically is an initial point of intake for the request. Additionally, or alternatively, another frontend system (not shown) can decide what backed systems are involved to fulfill the request (based on multiple factors such as the service requested, source of the request, and so forth) and sends requests to them.

The architecture 100 comprises a plurality of data centers 108, 110. Each data center comprises a load balancing system 112, 114, along with a plurality of systems 116, 118, 120, 122. Each system may have dedicated and/or shared data storage 124, 126, 128, 130.

The load balancing system 106 identifies a data center 108, 110 and routes the request to the appropriate data center. Once received by the data center, the load balancing system 112, 114, routes the request to the appropriate system(s) 116, 118, 120, 122 in order to fulfill the request. In order to fulfill the request, systems 116, 118, 120, 122 may generate new and/or additional requests among themselves to fulfill the request. Additionally, one data center may generate new and/or additional requests for systems in a different data center to fulfill the request.

Once the request is fulfilled, a response is returned. The frontend system can assemble the responses from all the systems involved in filling the request and build an aggregated response which is transmitted back to the sender.

Figure 2:
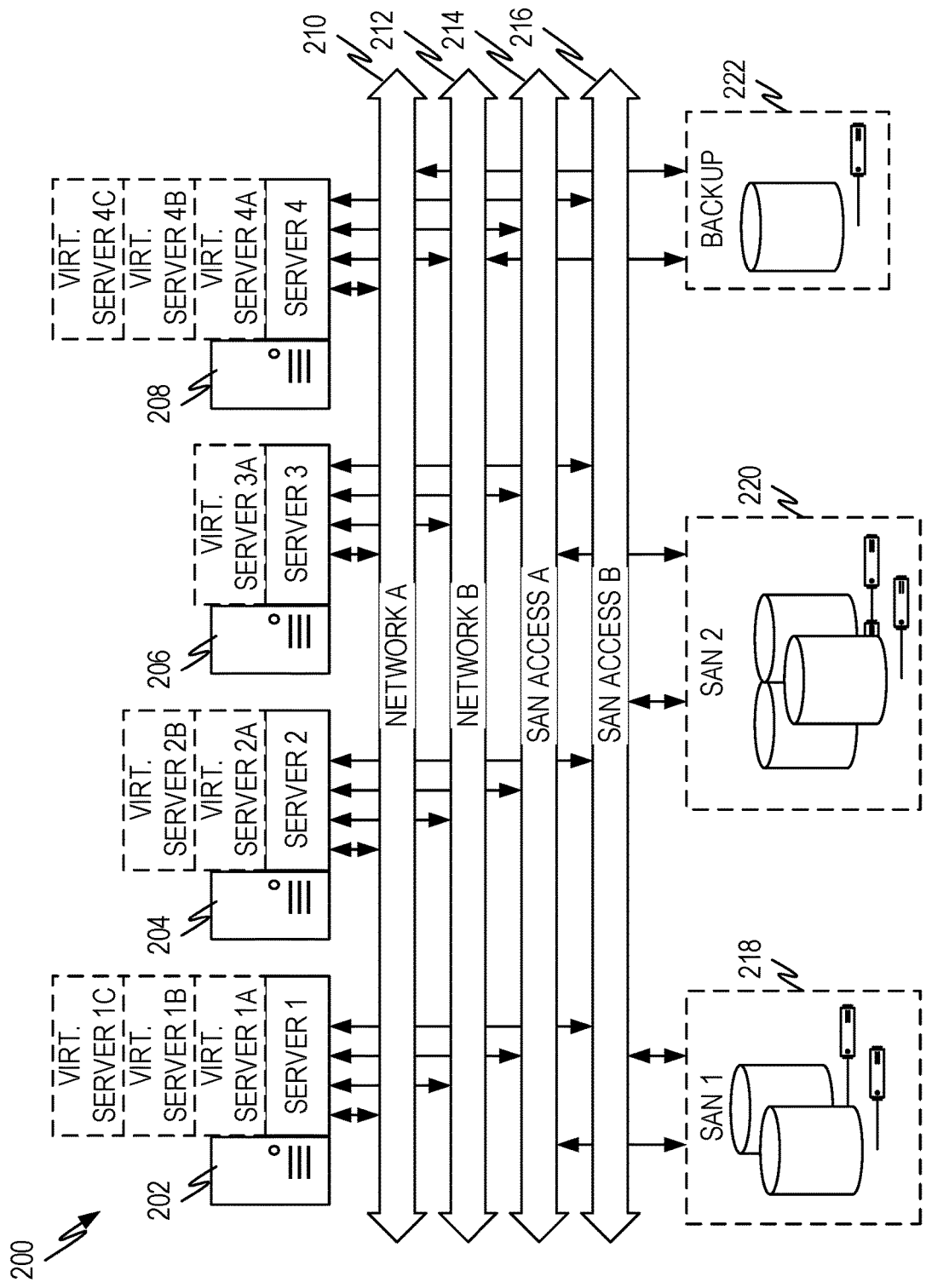
FIG. 2 illustrates another example architecture of a system to provide multiple service offerings.

FIG. 2 illustrates another example architecture 200 of a system to provide multiple service offerings. This architecture 200 illustrates more of a hardware view of what a datacenter can look like. A data center has a plurality of systems 202, 204, 206, 208. Each system can comprise both physical (i.e., non-virtual) and virtual systems. Thus system 202 comprises server 1, virtual server 1A, virtual server 1B, virtual server 1C, system 204 comprises server 2, virtual server 2A, virtual server 2B and so forth. Each of the physical and/or virtual servers can be connected by one or more networks 210, 212, to other systems in the data center or to a network outside the data center. Additionally, the data center can have shared storage, such as variety of storage area networks (SAN) SAN1 218, SAN2 220, backup storage 222 and so forth. Storage area networks can be accessed by the various systems via storage area network accesses (SAN Access A 214, SAN Access B 216). Systems can also have dedicated storage (not shown).

The architectures of FIGS. 1 and 2 show that a variety of systems (physical and/or virtual) can be involved in providing the different service offerings. In addition, a given system can be used multiple times to service an individual request. Thus, the particular systems used in fulfilling a request to any given service can be numerous and varied. In order to calculate the backend resource cost for providing a service, the systems involved in providing the service are identified, the capacity for each system is identified, the cost per request is calculated, the systems used in filling a request are identified, and total cost for a request can be calculated by aggregating across all systems used in filling a request, the cost per request times the number of times the system is used. These functions are described in greater detail below.

Figure 3:
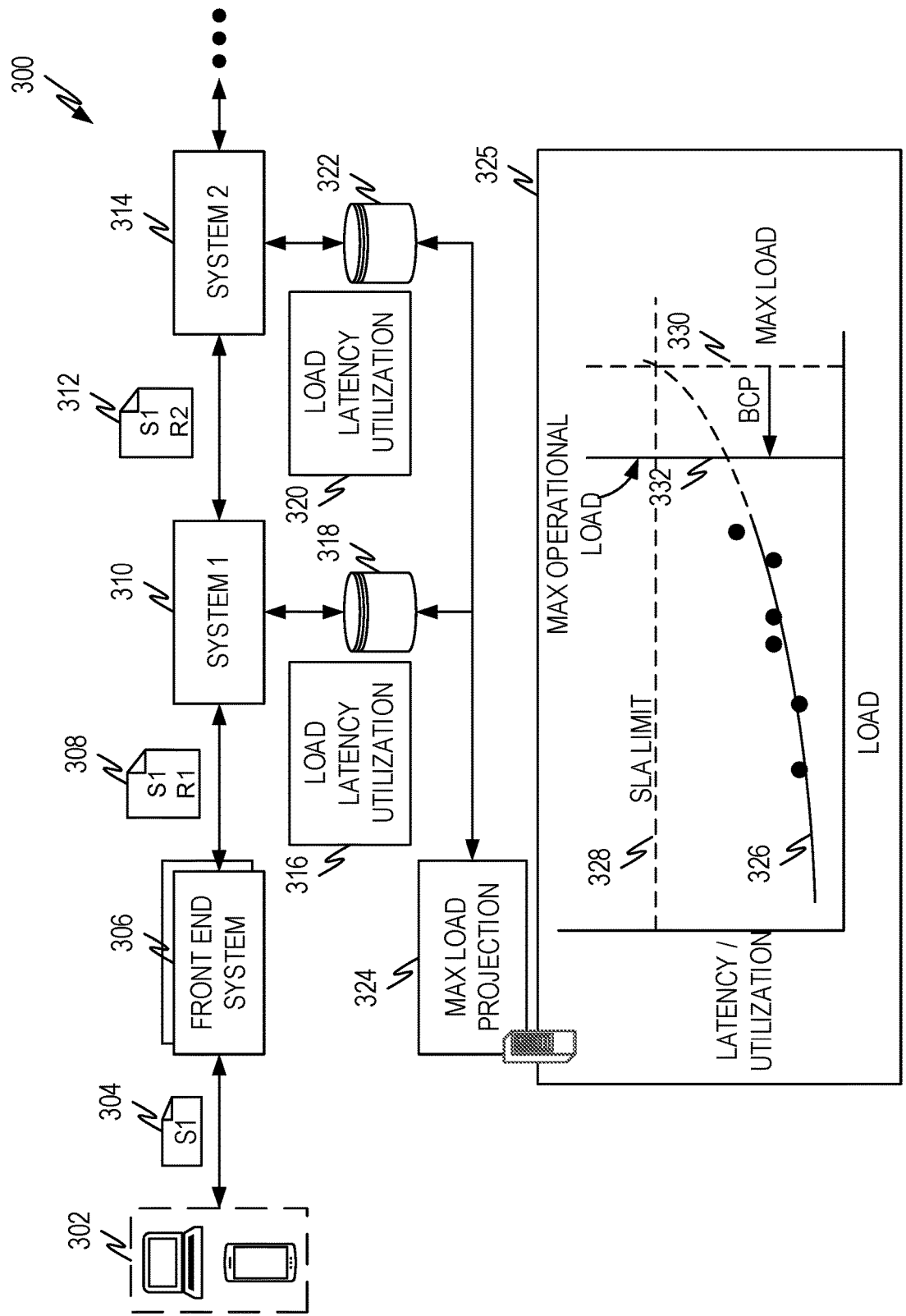
FIG. 3 illustrates an example architecture to measure load, latency and utilization and to project maximum operational load.

FIG. 3 illustrates an example architecture 300 to measure load, latency and utilization and to project maximum operational load. The illustrated architecture is able to achieve the projections of maximum operational load without running any special tests and relies on normal operational data to accomplish the projection. Unlike traditional approaches which rely on special stress tests to identify a maximum operational load (i.e., how many requests a service can handle), using data gathered during normal operations is less expensive and does not require taking a service off line or replicating the service in a test environment.

A request 304 to access a service comes from an entity 302 and is received by the online service. Requests to access a service are typically received by one or more front end systems 306 which can do a variety of tasks, one of which is to ensure that the request 304 gets properly routed to the systems that will fulfill the request. This may entail changing the request 304 by adding information to the request, repackaging the request, reformulating the request, or creating one or more new requests containing information extracted from the received request 304. The forwarded request(s) 308, which may be the original request 304 or one of the just recited options, is sent to one or more systems 310 for processing. Multiple requests may be sent in parallel. These systems 310 may forward the request 312 to additional systems 314 in order to fulfill the request. Again, the forwarded request 312 can be the original request(s) 308 or a changed request (i.e., by adding information to the request, repackaging the request, reformulating the request, or creating a new request, etc.). This can continue until the request is fulfilled and a response returned to the sender 302.

For each system involved in processing the request (i.e., 310, 314, etc.), the systems can be instrumented to collect information on the load and the latency and/or utilization. In this context, the load is typically measured in the number of requests being serviced or the number of requests being serviced in a given period of time, such as the number of requests per second. Latency is the difference between the time when the request is received and when the request is fulfilled (or sent along for further processing). Utilization is a measure of how busy the system is, such as CPU utilization, utilization of other system resources such as I/O, RAM, storage, number of threads, and/or so forth.

The collected load and latency and/or utilization metrics 316, 320 can be stored in memory, on a disk, or so forth as shown by data store 318 and 322. Storing the metrics in one or more data stores 318, 322 allows analysis of the data as next described.

A system, method, and/or so forth 324 projects the maximum operational load through analysis of the collected data. This is done through taking the collected data and curve fitting a curve 326 to the collected data. This can be accomplished through regression techniques that are known in the art, with the degree of regression chosen to give the best match to the data. For example, in some embodiments linear regression is used. In other embodiments, exponential regression, quadratic regression or some other order regression is used.

With the fit curve 326 a projection can be made of the maximum operational load. The method 324 identifies a service level agreement (SLA) limit 328 for the appropriate metric. Thus, if the curve is load vs. latency, a latency SLA is identified. The latency SLA identifies the maximum latency that can occur without the agreement being violated. If the curve is load vs. utilization, the SLA agreement will specify the maximum load that can occur without violating the agreement.

The SLA limit 328 allows the maximum load 330 that can occur without violating the SLA. The maximum operational load 332 will be less than or equal to this maximum load 330. In some instances, systems cannot be allowed to reach the maximum load 330 for a variety of reasons. For example, a business continuation plan (BCP) may require a system to handle additional load if a system fails or if a data center fails, etc. Thus, in these instances a "reserve" capacity is typically held. For these embodiments, the maximum operational load 332 is the maximum load 330 less the reserved capacity as indicated in the diagram.

The SLA limit 328 can be an aggregate SLA limit if the curve being fit is an overall curve (i.e., for a particular completed service request 304) or can be a portion of an overall SLA limit allocated to a particular system. In other words, if the load vs. latency/utilization calculation 325 is for a particular system 310, 314, the SLA limit is for the particular system 310, 314 that the load vs. latency/utilization calculation 325 is being performed. Furthermore, load vs. latency/utilization calculations 325 can be further broken down into particular services if desired. In these embodiments, the data collected 316, 320 is collected by service (e.g., image search requests, video search requests, etc.) and the curve fit and calculation 325 is performed on a per service or per system, per service basis.

Figure 4:
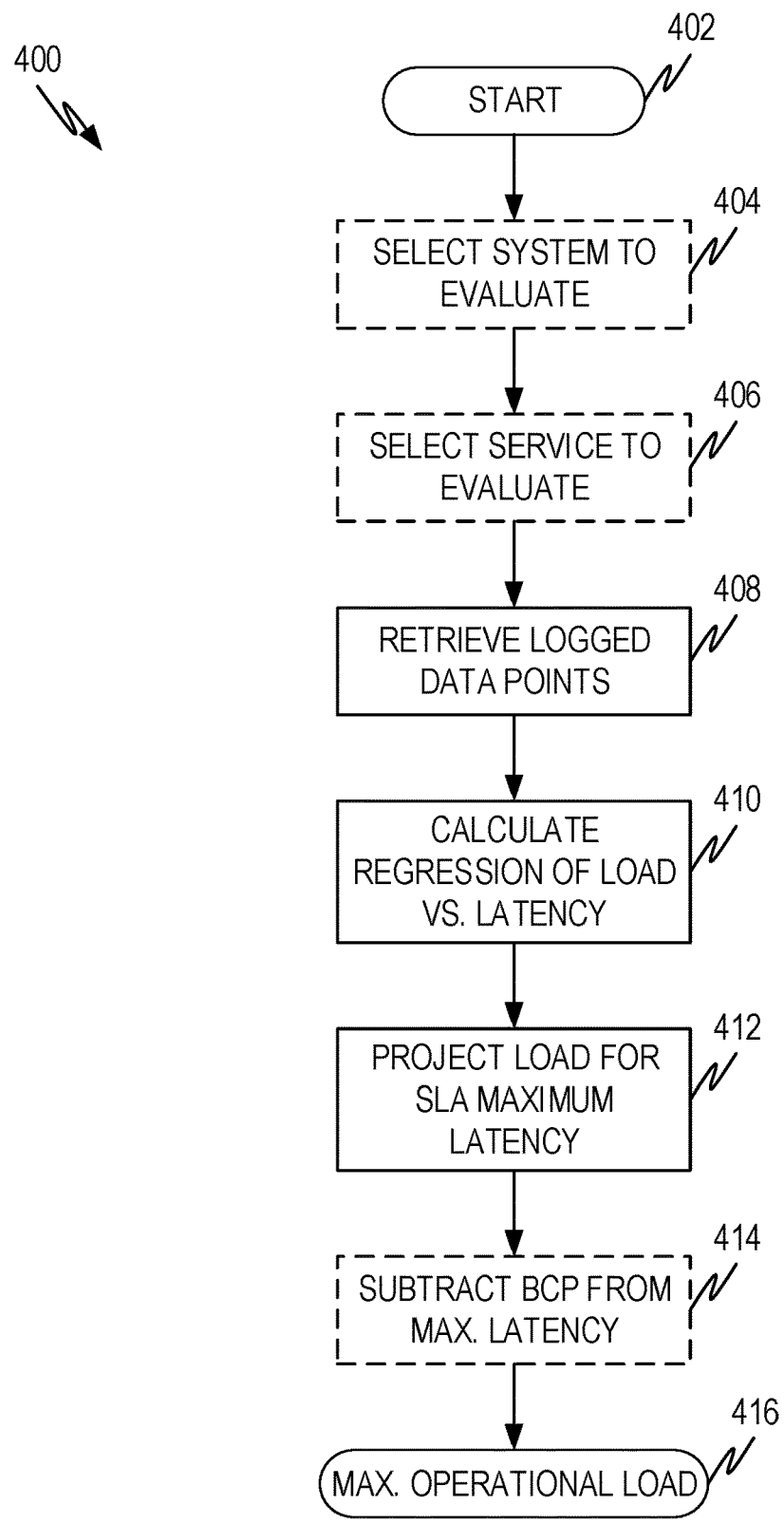
FIG. 4 illustrates an example flow diagram to project maximum operational load.

FIG. 4 illustrates an example flow diagram 400 to project maximum operational load. In the flow diagram the dependent variable of latency will be used for illustration purposes. However, the method can also be used to perform the load vs. utilization calculation as explained above by substituting information regarding utilization in place of the information regarding latency in the diagram of FIG. 4.

The method starts in operation 402 and proceeds to operations 404 and 406. As discussed above, the maximum operational load can be calculated for an entire service, or on a per system basis, on a per system, per service basis, and so forth. The maximum operational load for the entire service is typically limited by the slowest (i.e., the smallest maximum operational load) system in the chain. Operations 404 and 406 identify the appropriate system(s) (operation 404) and/or service(s) (operation 406) that will be used for the load vs. latency calculation.

Once the appropriate system(s) and/or service(s) are identified, the relevant logged data is extracted by operation 408. As indicated above, the logged data comprises an independent variable (i.e., load) and one or more dependent variables (i.e., latency and/or utilization). Thus, operation 408 extracts the relevant data pairs (e.g., load/latency) for the appropriate system(s) and/or service(s) identified in operations 404 and 406.

Operation 410 calculates the appropriate regression to fit the appropriate order curve to the data set extracted by operation 408. As described above, the regression can fit a curve of an order best suited to the shape of the data, such as a linear curve, exponential curve, quadratic curve, and so forth.

Operation 412 identifies the appropriate latency SLA limit as discussed above and based on the latency SLA limit and the fit curve calculates the maximum load corresponding to the latency SLA limit. As described above, the SLA limit will be the SLA limit for the selected system(s) and/or service(s).

Once the maximum load has been calculated, the maximum operational load can be calculated by subtracting any reserve capacity, such as capacity reserved to comply with a business continuation plan. Operation 414 illustrates this calculation, assuming that reserve capacity is appropriate for the system(s) and/or service(s) selected by operations 404 and 406. In other words, not every system and/or service (or combination thereof) will necessarily have a BCP reserve deducted off of the maximum load calculated by operation 412.

Operation 416 illustrates the resultant calculated maximum operational load. The cost per request is calculated by dividing the maximum operational load by the number of requests serviced.

The architecture of FIG. 3 and flow diagram of FIG. 4 can also be used to identify systems that don't fit the expected patterns of load vs. latency/utilization. As discussed below, some systems that are involved in providing a service can be of a non-production "category." For example, incubation systems are often brought online to test various aspects such as a new version of a service, new system configurations, and so forth. Because these type of systems are not production systems, they may not follow the expected load vs. latency/utilization pattern. Thus, as data is collected, the maximum operational load calculation described above may reveal a system that simply doesn't fit the expected pattern. For example, the calculated maximum operational load can be vastly different than expected or the curve doesn't fit the data well, or any other number of indicators can identify that a particular system doesn't fit the expected pattern.

When a system is identified that doesn't fit the expected pattern, the system can be left out of the backend resource cost calculation (explained below) or the calculation can be otherwise adjusted.

Because the architecture and method of FIGS. 3 and 4 use operational data to perform calculations, a data pipeline to periodically calculate the information can be established. Thus, the data can be calculated each day and the daily data evaluated for trends and other artifacts to make the calculated maximum operational load more accurate. Thus, peaks and valleys in the data can be evaluated and a time-varying projection of maximum operational load can be created.

Additionally, or alternatively, statistics such as the mean, median, variance and so forth can be calculated.

Figure 5:
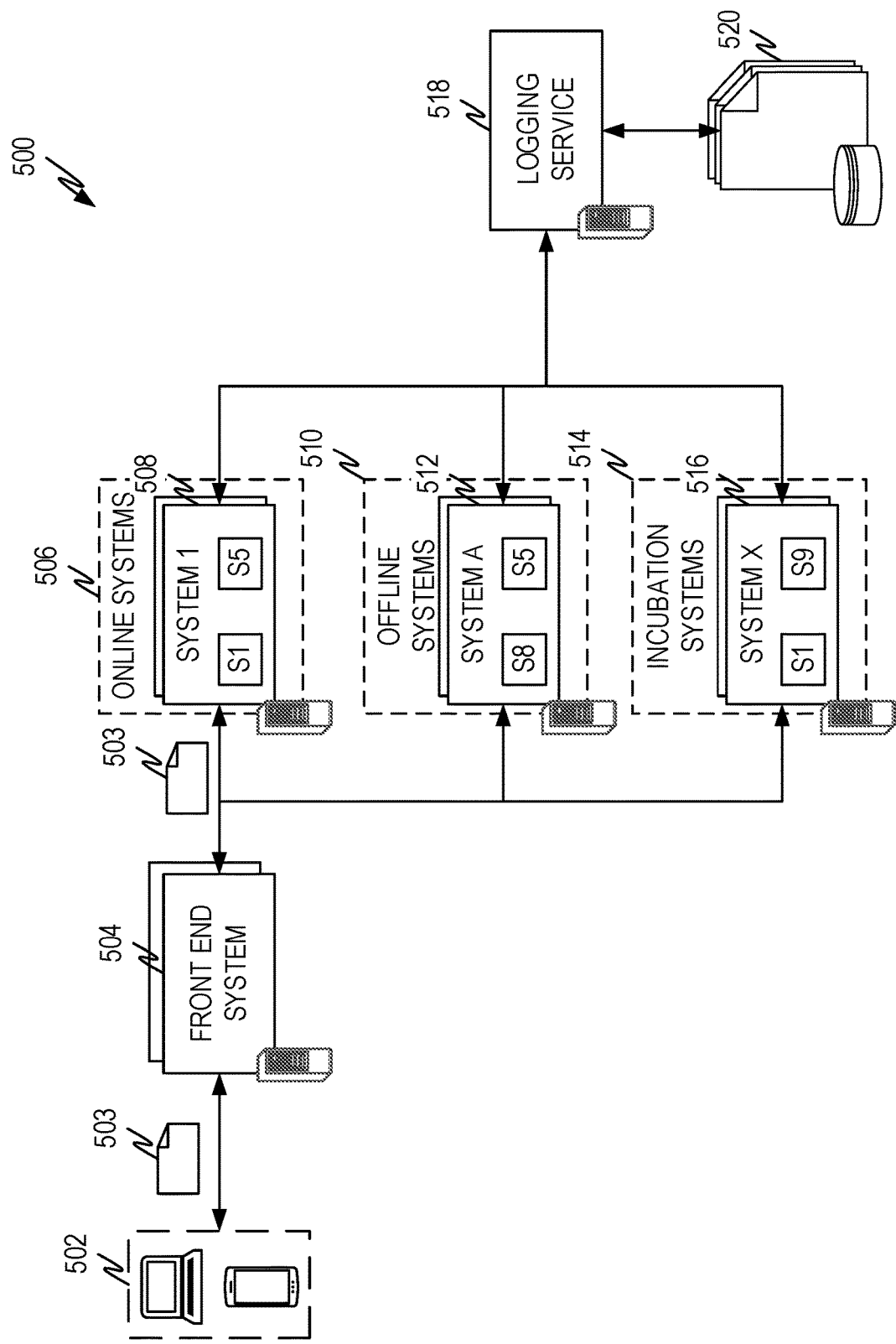
FIG. 5 illustrates an example architecture to log requests so that the systems used to provide a service can be identified.

FIG. 5 illustrates an example architecture 500 to log requests so that the systems used to provide a service can be identified. A request 503 from an entity 502 to access a service is received by the online service, typically by one or more front end systems 504. As discussed elsewhere, there may be many different systems that are involved in filling the request 503. The many different systems may be in one or more different states (e.g., online, offline, etc.) and/or be of different types of systems. The various types of systems can be broken down into various broad categories. Representative categories of systems illustrated in FIG. 5 include online systems 506 (i.e., systems that are online and servicing requests), offline systems 510 (i.e., systems that are offline for one reason or another), and incubation systems 514 (i.e., systems that are being used to test various things, such as new versions of provided services, new system configurations, and so forth). Other categories of systems may also reside in a data center.

As discussed above, it can be difficult to identify all the various systems that are involved in providing a particular service. For example, in FIG. 5, system 1 and system X are illustrated as helping to provide service S1 as well as different services. In order to identify which systems are involved in providing particular services, front end system 504 can associate a unique identifier with each request 503 that is received. This unique identifier can then be passed between the systems that provide the service so that metrics associated with the request can be logged and/or aggregated, such as by a logging service 518.

Thus, even systems that are currently offline such as offline systems 510 can have previously logged information so that the logging service 518 can extract contributions of the offline systems 510 to providing a particular service.

The logging service 518 can be a local logging service that executes on each system, a centralized logging service, or any combination thereof. The details of the logging service are not specifically important to the disclosure. Logging services are well known and any type of logging service will work as long as the logging service collects the desired information 520 and can provide the data for the calculations discussed below.

The logging service can collect one or more of the following information in any combination:

1. The unique identifier associated with the request;
2. The system being logged (i.e., which system is producing the data being logged);
3. The service associated with the request (i.e., which service is the request accessing);
4. Resources used and/or accessed by the request (i.e., which databases, etc.);
5. Information about the entity that sent the request such as any combination of: an identifier associated with the requesting entity; the type of user (i.e., based on demographics or other such information); the region where the request originated; the language of the request (i.e., English, Chinese, etc.); other entity information; and
6. Other information that will be used to break down the backend resource cost calculation such as which data center the request was routed to, etc.

Figure 6:
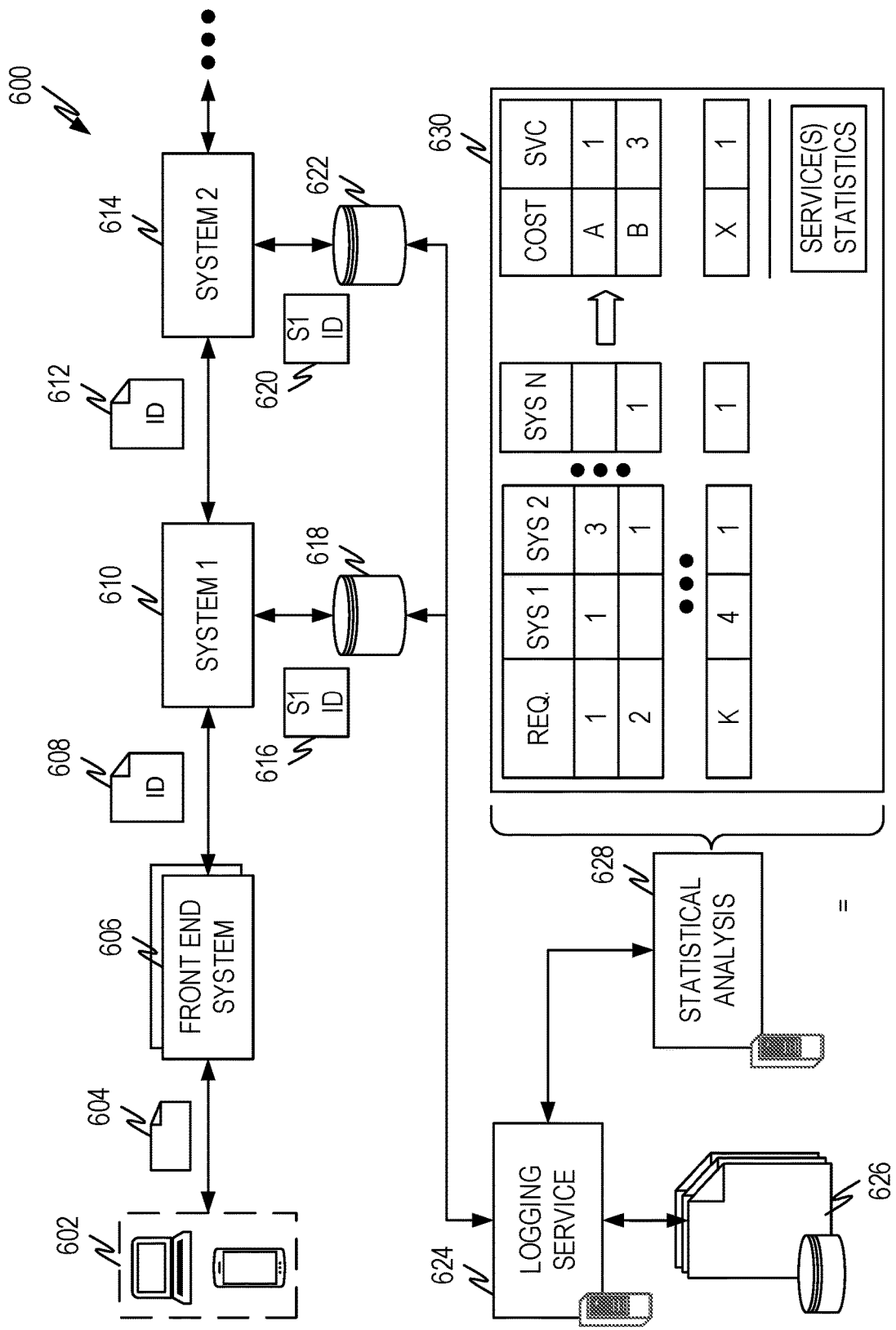
FIG. 6 illustrates an example architecture to statistically analyze the systems that are used to provide a service.

FIG. 6 illustrates an example architecture 600 to statistically analyze the systems that are used to provide a service. A request 604 is received from an entity 602 and one or more front end systems 606 assign a unique ID to the request as previously discussed and as illustrated by request 608, 612.

As the various systems 610, 614 receive the request (or a request associated with the original request as discussed above), they log information 616, 620 into one or more data stores 618, 622 and/or send the log information 616, 620 to a logging service 624 for storage in a data store 626 that can be later analyzed as previously discussed. The logging service 624 (and the systems 610, 614) capture the information that allows not only the systems involved in providing a service to be identified, but other information as discussed above.

Statistical analysis can be performed offline from the captured data as indicated by the statistical analysis system 628. The method of the statistical analysis is discussed in greater detail in conjunction with FIG. 7 and FIG. 8 below.

Because the logging service 624 captures the unique ID associated with a request as well as the systems that are involved in filling the request, the statistical analysis system 628 can trace all the systems involved with a particular request and the number of times a request flows through a given system by extracting records associated with a given unique ID. Since the system identifier (see above) is captured, or the logged data is associated with a particular system, occurrences of the unique ID in a given system log identifies a system associated with a given request and the number of times that system is used in filling the request.

The statistical analysis system 628 analyzes records from the logging service identifies which systems and how many times each system is used for each request in the sample set. The backend resource cost per request for the relevant systems are multiplied by the number of times the system is used and the total cost for the request is the aggregated backend resource cost for each system. For example, in the illustrated table 630, request 1 uses system 1 once and system 2 three times. The aggregated backend resource cost for that request is 1*sys1 cost/request+3*sys2 cost/request, the result of which is represented as A in the table 630.

While a two-dimensional table 630 is illustrated, in other embodiments, a multidimensional data structure can be created, with each dimension representing a desired dimension that the backend resource costs may be summarized along. For example, another dimension can be added to indicate one of the other dimensions of data captured by the logging system discussed above. As a representative example, the region where the request originated may be added as a dimension. With that dimension added, the backend resource costs can be broken down by originating region. The time of the request can be logged and with that dimension added, the backend resource costs can be broken down by time of the request received. Any other dimensions captured by the logging system can be added as a dimension in order to break down the data by that dimension as well. Thus, in general, the output of the statistical analysis 630 is a multi-dimensional structure that allows the calculated backend resource costs to be broken down and/or summarized along any of the dimensions.

Since the architecture 600 can receive many thousands of requests per second, the amount of data available to analyze can quickly outstrip the ability of the statistical analysis system 628 to analyze it. Thus in some embodiments, the statistical analysis system 628 takes a statistical sampling of the logged data 626 in order to perform the calculations to produce the backend system costs. In one representative example, a certain number of records, each representing the system trace associated with a particular request, can be randomly extracted from the logging data store 626. In another representative example, all requests associated with a certain period of time can be selected. In another representative example, a fixed number of requests associated with a given set of services can be extracted. In yet another representative example, the statistical sampling can be selected to give a good representation of the various factors that impact which systems are used, such as language of the request, region of origination, type of request, and so forth. Other sampling techniques are also possible.

In an alternative embodiment, rather than log all data and then statistically sample the logged data, the requests can be statistically sampled and only data associated with selected requests can be logged. In other words, rather than applying the statistical sampling on the back end (i.e., after logging), the statistical sampling is applied on the front end (i.e., in selecting which requests will be logged).

Figure 7:
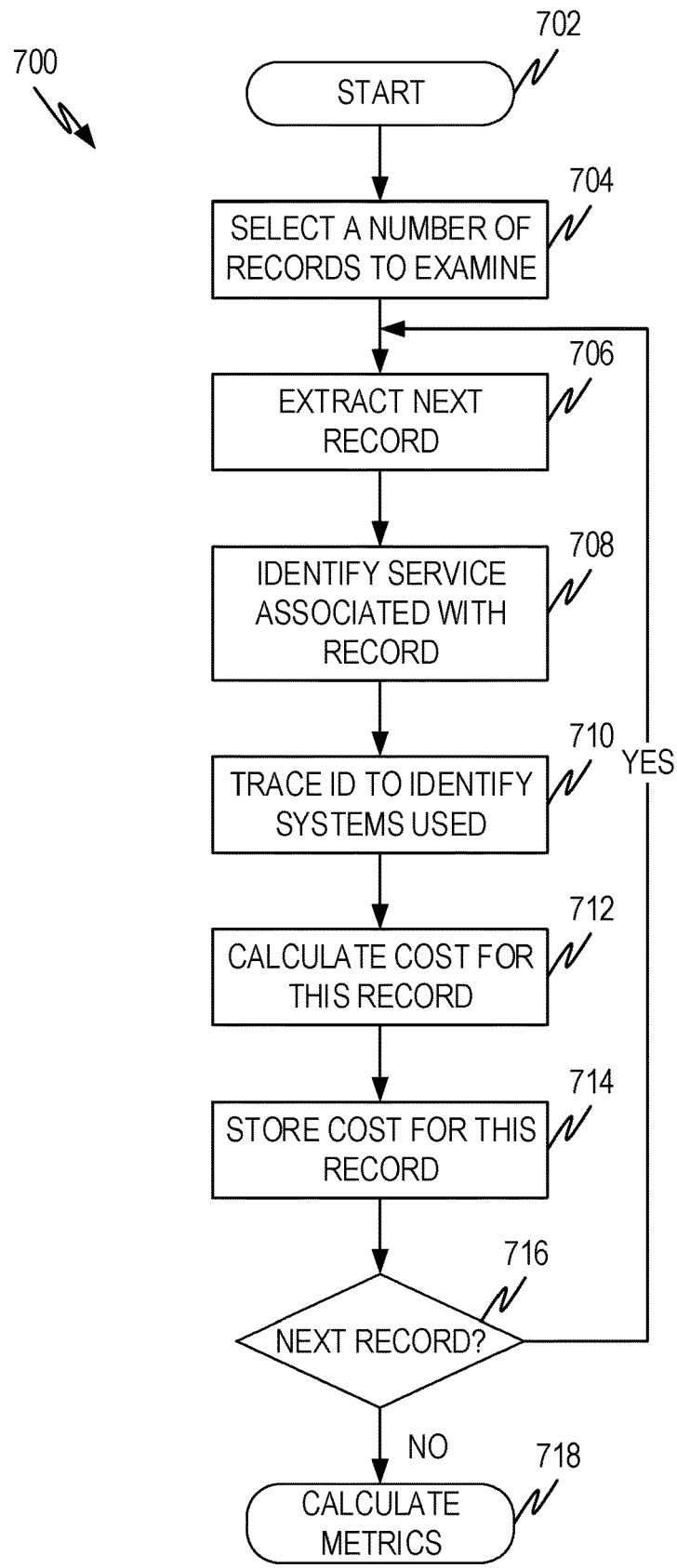
FIG. 7 illustrates an example flow diagram to calculate backend resource costs to provide a service.

FIG. 7 illustrates an example flow diagram 700 to calculate backend resource costs and other statistics about the service in accordance with the architecture of FIG. 6. The method beings at operation 702 and proceeds to operation 704 where the data set to be analyzed is extracted from the logging data store. As indicated above, different statistical sampling techniques can be used to get a valid statistical sample to analyze that are in accordance with the goals of the analysis. If the logged data is small, or in embodiments that do not use statistical sampling, all data can be analyzed. If the data was sampled prior to logging (i.e., the statistical sampling was applied at the front end), all data can also be analyzed.

Once the data set to be evaluated has been identified in operation 704, a loop is performed that loops over all the records in the data set and accumulates the information to calculate the statistics and metrics illustrated and discussed above. Operation 706 retrieves the next record in the data set. Operation 708 identifies information for all dimensions that will be used to summarize the data. For example, if the backend resource cost is to be summarized by service, operation 708 identifies which service is associated with the record, for example, by examining the logged information to identify which service is associated with the unique identifier (i.e., the request of the data record). If the data is to be summarized by other dimensions, operation 708 also identifies the values of those dimensions (originating region, time, user type, etc.). Operation 710 traces the unique identifier and collects a list of all the systems (and the number of times each system was used) associated with the unique identifier. For example, in the example of request K in table 630, the method would identify that system 1 was used 4 times, system 2 was used once and system N was used once.

Operation 712 calculates the total cost for the record. This process is illustrated in greater detail in FIG. 8, and is accomplished by aggregating the individual system costs for the record into a total cost for the record.

Operation 714 stores the cost for the record by the dimensions identified in operation 708 so that appropriate statistics can be calculated as discussed below by the desired dimensions. Thus, if it is desired to summarize the backend resource cost by what time certain requests occur and by service type, the cost for the record is stored in a multidimensional data structure by time and by service type. Alternatively, statistics can be accumulated by the appropriate dimensions in an incremental manner in operation 714 rather than waiting until the backed resource costs for each record in the entire data set has been calculated and calculating the statistics at the end (i.e., in operation 718).

Operation 716 identifies whether any remaining records exist and if so, the "yes" branch out of operation 716 is taken back to operation 706 where the next record is extracted. If no remaining records exist, the "no" branch out of operation 716 is taken to operation 718.

Operation 718 represents any final calculations that are done to arrive at the desired metrics. For example, statistics can be calculated across each dimension of the multi-dimensional data structure. For example, if the backend resource costs for each record in the sample set has been summarized by service, then the average cost can be calculated by averaging the backend resource costs for each request for that service. Similarly, other statistical measures such as the standard deviation, median, histograms, probability density functions and other such measures can be calculated. If multiple dimensions were used, the statistical metrics can be calculated along those dimensions as well in order to summarize the backend resource costs along any combination of desired dimensions (i.e., by service, by service and originating region, etc.).

Figure 8:
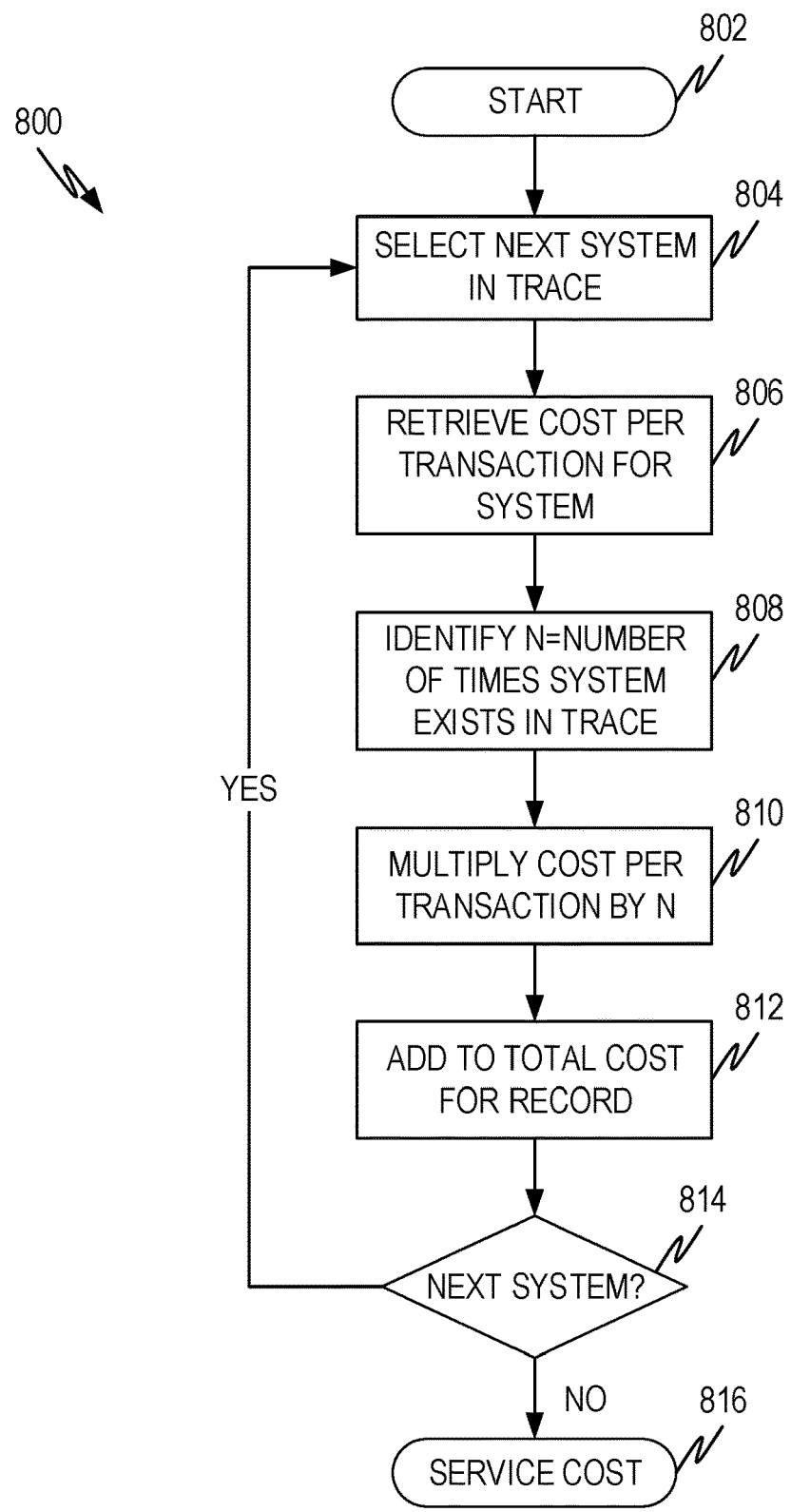
FIG. 8 illustrates an example flow diagram to calculate the backend resource cost for an individual request to provide a service.

FIG. 8 illustrates an example flow diagram 800 to calculate the backend resource cost for a record (i.e., single request) in the sample set (i.e., the details of operation 712). The method of FIG. 8 calculates the backend resource costs for a transaction by:

$$C = \sum_{i=1}^{N} M_i * C_{ri}$$

Where: C is the cost for the request;
$M_i$ is the number of times the $i^{th}$ system was used in filling the request;
$C_{ri}$ is the cost per request for the $i^{th}$ system;
N is the number of systems, with the index i being used to identify each system.

Returning for a moment to FIG. 7, operation 710 identifies a list of systems used in the request along with the number of times the system was used in that request. For example, if the table 630 is the data set, and the request is request #1, operation 710 will have identified system 1 was used once and system 2 was used three times in filling request 1. The method of FIG. 8 uses the information extracted by operation 710.

The method begins at operation 802 and proceeds to 804 where the next system identified by operation 710 is selected. Operation 806 retrieves the cost per request (i.e., $C_{ri}$ in the equation above) calculated as discussed in conjunction with FIGS. 3 and 4. Operation 808 identifies the number of times the system identified in operation 804 is used in filling the request under consideration (i.e., $M_i$ in the equation above). Operation 810 multiplies the cost per transaction by the number of times the system was used to yield the system cost for the transaction. Operation 812 then adds the system cost to the aggregated cost so far for the request.

In operation 814, a test is done to see if there are any more systems in the list (i.e., identified by operation 710). If so, the "yes" branch is taken so the cost for the next system can be calculated and aggregated. If not, the "no" branch is taken and the total value aggregated by operation 812 is the request cost 816.

Example Machine Architecture and Machine-Readable Medium

Figure 9:
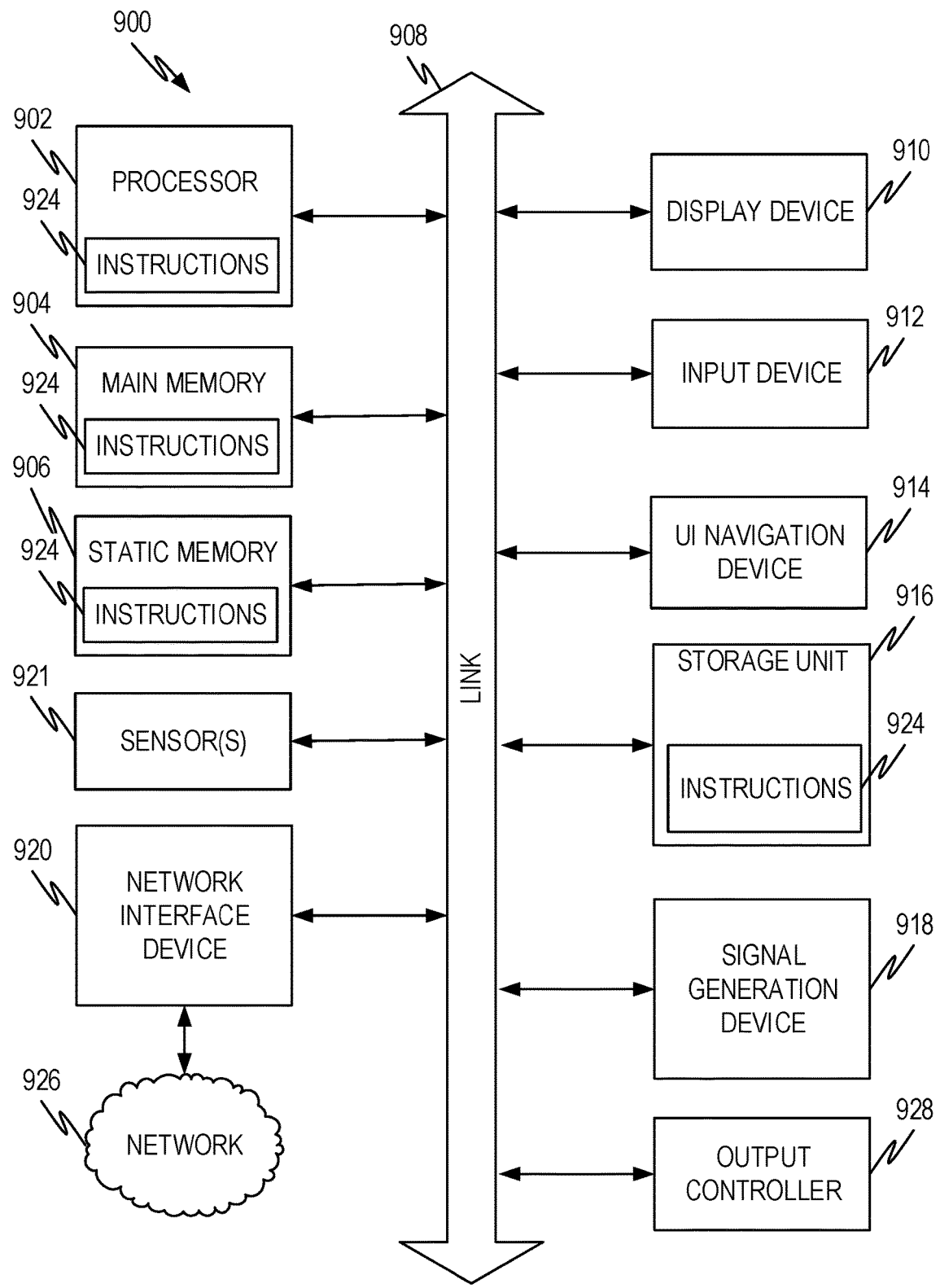
FIG. 9 illustrates a representative machine architecture suitable for implementing the systems and so forth or for executing the methods disclosed herein.

FIG. 9 illustrates a representative machine architecture suitable for implementing the systems and so forth or for executing the methods disclosed herein. The machine of FIG. 9 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless) to connect to and/or communicate over one or more networks 926.

Executable Instructions and Machine-Readable Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for calculating resource costs of online service offerings, comprising:

extracting, from a logging database, a statistical sampling comprising a plurality of records, each record representing a request for a service of a plurality of online services, each record comprising a request identifier and a plurality of systems utilized to fulfill the request;

for each record in the statistical sampling, performing operations comprising:

identifying a list of systems comprising the plurality of systems utilized to fulfill the request; and calculating a backend resource cost for the record based on the backed resource cost for each system in the list of systems; and calculating at least one statistical metric using the backend resource cost for at least a subset of the records in the statistical sampling.

Example 2

The method of example 1, further comprising:

predicting a maximum operational load for the service based on data collected during normal operation of the service; and calculating a backend resource cost per request by dividing a cost by the maximum operational load.

Example 3

The method of example 2, wherein calculating the backend resource cost for the record comprises performing operations comprising:

for each system in the list of systems:

retrieving the backend resource cost per request;

identifying a number of times the system is used in filling the request;

calculating a system cost for the record by multiplying the backend resource cost per request and the number of times the system is used in filling the request; and accumulating the system cost.

Example 4

The method of examples 1, 2, or 3, wherein the at least one statistical metric comprises at least one of:
a mean backend resource cost;
a medial backend resource cost;
a standard deviation of the backend resource cost; and
a probability density function of the backend resource cost.

Example 5

The method of example 1, 2, or 3, further comprising:
collecting data describing a load and at least one of either a latency or a utilization during normal operation of the service;
using regression to fit a curve to the collected data, the curve representing at least one of either the latency or the utilization for the load;
using the fitted curve, predicting a load value at which at least one of either the latency of the utilization will exceed a service level agreement;
calculating a maximum operational load as being equal to or less than the load value; and
calculating a backend resource cost per request for the system by dividing a resource cost for the system by the maximum operational load.

Example 6

The method of example 5, wherein the maximum operational load is calculated by subtracting a business contingency load from the load value.

Example 7

The method of example 1, 2, or 3, wherein the backend resource cost comprises at least one of:
a monetary cost;
a CPU utilization cost;
a memory utilization cost;
an I/O utilization cost;
a bandwidth utilization cost; and
a storage utilization cost.

Example 8

The method of example 1, 2, or 3, further comprising categorizing each request by at least one dimension, the at least one dimension comprising one or more of:
the service;
a region representing a source of the request;
a traffic type; and
a language; and
calculating the backend resource cost along at least one selected dimension.

Example 9

A computing system comprising:
a processor and executable instructions accessible on a machine-readable medium that, when executed, cause the system to perform operations comprising:
extracting, from a logging database, a statistical sampling comprising a plurality of records, each record representing a request for a service of a plurality of online services, each record comprising a request identifier and a plurality of systems utilized to fulfill the request;
for each record in the statistical sampling, performing operations comprising:
identifying a list of systems comprising the plurality of systems utilized to fulfill the request; and
calculating a backend resource cost for the record based on the backed resource cost for each system in the list of systems; and
calculating at least one statistical metric using the backend resource cost for at least a subset of the records in the statistical sampling.

Example 10

The system of example 9, wherein the operations further comprise:
predicting a maximum operational load for the service based on data collected during normal operation of the service; and
calculating a backend resource cost per request by dividing a cost by the maximum operational load.

Example 11

The system of example 10, wherein calculating the backend resource cost for the record comprises performing operations comprising:
for each system in the list of systems:
retrieving the backend resource cost per request;
identifying a number of times the system is used in filling the request;
calculating a system cost for the record by multiplying the backend resource cost per request and the number of times the system is used in filling the request; and
accumulating the system cost.

Example 12

The system of example 9, wherein the at least one statistical metric comprises at least one of:
a mean backend resource cost;
a medial backend resource cost;
a standard deviation of the backend resource cost; and
a probability density function of the backend resource cost.

Example 13

The system of example 9, 10, 11, or 12, wherein the operations further comprise:
collecting data describing a load and at least one of either a latency or a utilization during normal operation of the service;
using regression to fit a curve to the collected data, the curve representing at least one of either the latency or the utilization for the load;

using the fitted curve, predicting a load value at which at least one of either the latency of the utilization will exceed a service level agreement;
calculating a maximum operational load as being equal to or less than the load value; and
calculating a backend resource cost per request for the system by dividing a resource cost for the system by the maximum operational load.

Example 14

The system of example 13, wherein the maximum operational load is calculated by subtracting a business contingency load from the load value.

Example 15

The system of example 9, 10, 11, or 12, wherein the backend resource cost comprises at least one of:
a monetary cost;
a CPU utilization cost;
a memory utilization cost;
an I/O utilization cost;
a bandwidth utilization cost; and
a storage utilization cost.

Example 16

The system of example 9, 10, 11, or 12, wherein the operations further comprise categorizing each request by at least one dimension, the at least one dimension comprising one or more of:
the service;
a region representing a source of the request;
a traffic type; and
a language; and
calculating the backend resource cost along at least one selected dimension.

Example 17

A machine-readable medium having executable instructions encoded thereon, which, when executed by at least one processor of a machine, cause the machine to perform operations comprising:
collecting data describing a load and at least one of either a latency or a utilization during normal operation of an online service;
using regression to fit a curve to the collected data, the curve representing at least one of either the latency or the utilization for the load;
using the fitted curve, predicting a load value at which at least one of either the latency of the utilization will exceed a service level agreement;
calculating a maximum operational load as being equal to or less than the load value;
calculating a cost per request by dividing a cost by the maximum operational load;
extracting, from a logging database, a statistical sampling comprising a plurality of records, each record representing a request for a service of a plurality of online services, each record comprising a request identifier and a plurality of systems utilized to fulfill the request;
selecting at least one dimension to calculate a backend resource cost across;

for each record in the statistical sampling, performing operations comprising:
tracing the request identifier and identifying a list of systems utilized in filling the request associated with the request identifier; and
calculating the backend resource cost for the record based on the backed resource cost for each system in the list of systems;
accumulating the backend resource cost along the selected at least one dimension; and
calculating at least one statistical metric using the backend resource cost for at least a subset of the records in the statistical sampling.

Example 18

The machine-readable medium of example 17, wherein the selected at least one dimension comprises one or more of:
the service;
a region representing a source of the request;
a traffic type;
a user type; and
a language.

Example 19

The machine-readable medium of example 17, wherein the backend resource cost comprises at least one of:
a monetary cost;
a CPU utilization cost;
a memory utilization cost;
an I/O utilization cost;
a bandwidth utilization cost; and
a storage utilization cost.

Example 20

The machine-readable medium of example 17, 18, or 19, wherein calculating the backend resource cost for the record comprises performing operations comprising:
for each system in the list of systems:
retrieving the backend resource cost per request;
identifying a number of times the system is used in filling the request;
calculating a system cost for the record by multiplying the backend resource cost per request and the number of times the system is used in filling the request; and
accumulating the system cost.

Example 21

A method for calculating resource costs of online service offerings, comprising:
extracting, from a logging database, a statistical sampling comprising a plurality of records, each record representing a request for a service of a plurality of online services, each record comprising a request identifier and a plurality of systems utilized to fulfill the request;
for each record in the statistical sampling, performing operations comprising:
identifying a list of systems comprising the plurality of systems utilized to fulfill the request; and
calculating a backend resource cost for the record based on the backed resource cost for each system in the list of systems; and calculating at least one statistical metric using the backend resource cost for at least a subset of the records in the statistical sampling.

Example 22

The method of example 21, further comprising:
predicting a maximum operational load for the service based on data collected during normal operation of the service; and
calculating a backend resource cost per request by dividing a cost by the maximum operational load.

Example 23

The method of example 22, wherein calculating the backend resource cost for the record comprises performing operations comprising:
for each system in the list of systems:
retrieving the backend resource cost per request;
identifying a number of times the system is used in filling the request;
calculating a system cost for the record by multiplying the backend resource cost per request and the number of times the system is used in filling the request; and
accumulating the system cost.

Example 24

The method of example 21, 22, or 23, wherein the at least one statistical metric comprises at least one of:
a mean backend resource cost;
a medial backend resource cost;
a standard deviation of the backend resource cost; and
a probability density function of the backend resource cost.

Example 25

The method of example 21, 22, 23, or 24, further comprising:
collecting data describing a load and at least one of either a latency or a utilization during normal operation of the service;
using regression to fit a curve to the collected data, the curve representing at least one of either the latency or the utilization for the load;
using the fitted curve, predicting a load value at which at least one of either the latency of the utilization will exceed a service level agreement;
calculating a maximum operational load as being equal to or less than the load value; and
calculating a backend resource cost per request for the system by dividing a resource cost for the system by the maximum operational load.

Example 26

The method of example 25, wherein the maximum operational load is calculated by subtracting a business contingency load from the load value.

Example 27

The method of example 21, 22, 23, 24, 25, or 26, wherein the backend resource cost comprises at least one of:
a monetary cost;
a CPU utilization cost;
a memory utilization cost;
an I/O utilization cost;
a bandwidth utilization cost; and
a storage utilization cost.

Example 28

The method of example 21, 22, 23, 24, 25, 26, or 27, further comprising categorizing each request by at least one dimension, the at least one dimension comprising one or more of:
the service;
a region representing a source of the request;
a traffic type; and
a language; and
calculating the backend resource cost along at least one selected dimension.

Example 29

The method of example 28, wherein the at least one statistical metric is calculated along the at least one dimension.

Example 30

The method of example 25, or 26, wherein the maximum operational load is calculated on a per system basis.

Example 31

The method of example 30, wherein the backend resource cost per request is calculated by dividing a cost by the maximum operational load for a given system.

Example 32

The method of example 31, wherein the system cost for the record is calculated by multiplying the backend resource cost per request for the given system by the number of times the given system is used in filling the request.

Example 33

An apparatus comprising means to perform a method as in any preceding example.

Example 34

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for calculating resource costs of online service offerings, comprising:
    extracting, from a logging database, a statistical sampling comprising a plurality of records, each record representing a request for a service of a plurality of online services, each record comprising a request identifier and a plurality of systems utilized to fulfill the request, each identifier assigned so that each system involved in filling the request uses the same request identifier for the request;
    for each record in the statistical sampling, performing operations comprising:
        identifying a list of systems comprising the plurality of systems utilized to fulfill the request based on the associated identifier; and
        calculating a backend resource cost for the record based on the backend resource cost for each system in the list of systems;
    calculating at least one statistical metric using the backend resource cost for at least a subset of the records in the statistical sampling;
    predicting a maximum operational load for the service based on data collected during normal operation of the service; and
    calculating a backend resource cost per request by dividing a cost by the maximum operational load.

2. The method of claim 1, further comprising categorizing each request by at least one dimension, the at least one dimension comprising one or more of:
    the service;
    a region representing a source of the request;
    a traffic type; and
    a language; and
    calculating the backend resource cost along at least one selected dimension.

3. The method of claim 1, wherein calculating the backend resource cost for the record comprises performing operations comprising:
    for each system in the list of systems:
        retrieving the backend resource cost per request;
        identifying a number of times the system is used in filling the request;
        calculating a system cost for the record by multiplying the backend resource cost per request and the number of times the system is used in filling the request; and
        accumulating the system cost.

4. The method of claim 1, wherein the at least one statistical metric comprises at least one of:
    a mean backend resource cost;
    a medial backend resource cost;
    a standard deviation of the backend resource cost; and
    a probability density function of the backend resource cost.

5. The method of claim 1, wherein predicting a maximum operational load for the service comprises:
    collecting data describing a load and at least one of either a latency or a utilization during normal operation of the service;
    using regression to fit a curve to the collected data, the curve representing at least one of either the latency or the utilization for the load;
    using the fitted curve, predicting a load value at which at least one of either the latency of the utilization will exceed a service level agreement; and
    calculating the maximum operational load as being equal to or less than the load value.

6. The method of claim 5, wherein the maximum operational load is calculated by subtracting a business contingency load from the load value.

7. The method of claim 1, wherein the backend resource cost comprises at least one of:
    a monetary cost;
    a CPU utilization cost;
    a memory utilization cost;
    an I/O utilization cost;
    a bandwidth utilization cost; and
    a storage utilization cost.

8. A computing system comprising:
    a processor and executable instructions accessible on a machine-readable medium that, when executed, cause the system to perform operations comprising:
        extracting a statistical sampling comprising a plurality of records from a logging database, each record comprising a request identifier associated with a request and a list of systems utilized in filling the request, each identifier assigned so that each system involved in filling the request uses the same request identifier for the request;
        for each record in the statistical sampling, performing operations comprising:
            identifying the list of systems utilized to fulfill the request associated with the request identifier in the record; and
            calculating a backend resource cost for the record based on the backend resource cost for each system in the list of systems; and
        calculating at least one statistical metric using the backend resource cost for at least a subset of the records in the statistical sampling;
        predicting a maximum operational load based on data collected during normal operation of the service; and
        calculating a backend resource cost per request by dividing a cost by the maximum operational load.

9. The system of claim 8, wherein the operations further comprise categorizing each request by at least one dimension, the at least one dimension comprising one or more of:
    a service;
    a region representing a source of the request;
    a traffic type; and
    a language; and
    calculating the backend resource cost along at least one selected dimension.

10. The system of claim 8, wherein the backend resource cost comprises at least one of:
    a monetary cost;
    a CPU utilization cost;
    a memory utilization cost;
    an I/O utilization cost;
    a bandwidth utilization cost; and
    a storage utilization cost.

11. The system of claim 8, wherein calculating the backend resource cost for the record comprises performing operations comprising:
    for each system in the list of systems:
        retrieving the backend resource cost per request;
        identifying a number of times the system is used in filling the request;

calculating a system cost for the record by multiplying the backend resource cost per request and the number of times the system is used in filling the request; and accumulating the system cost.

12. The system of claim 8, wherein the at least one statistical metric comprises at least one of:
a mean backend resource cost;
a medial backend resource cost;
a standard deviation of the backend resource cost; and
a probability density function of the backend resource cost.

13. The system of claim 8, wherein
predicting a maximum operational load for comprises:
collecting data describing a load and at least one of either a latency or a utilization during normal operation of the service;
using regression to fit a curve to the collected data, the curve representing at least one of either the latency or the utilization for the load;
using the fitted curve, predicting a load value at which at least one of either the latency of the utilization will exceed a service level agreement; and
calculating the maximum operational load as being equal to or less than the load value.

14. The system of claim 13, wherein the maximum operational load is calculated by subtracting a business contingency load from the load value.

15. A machine-readable medium having executable instructions encoded thereon, which, when executed by at least one processor of a machine, cause the machine to perform operations comprising:
collecting data describing a load and at least one of either a latency or a utilization during normal operation of an online service;
using regression to fit a curve to the collected data, the curve representing at least one of either the latency or the utilization for the load;
using the fitted curve, predicting a load value at which least one of either the latency of the utilization will exceed a service level agreement;
calculating a maximum operational load as being equal to or less than the load value;
calculating a cost per request by dividing a cost by the maximum operational load;
extracting, from a logging database, a statistical sampling comprising a plurality of records, each record representing a request for a service of a plurality of online services, each record comprising a request identifier and a plurality of systems utilized to fulfill the request;
selecting at least one dimension to calculate a backend resource cost across; for each record in the statistical sampling, performing operations comprising:
tracing the request identifier and identifying a list of systems utilized in filling the request associated with the request identifier; and
calculating the backend resource cost for the record based on the backed resource cost for each system in the list of systems;
accumulating the backend resource cost along the selected at least one dimension; and
calculating at least one statistical metric using the backend resource cost for at least a subset of the records in the statistical sampling.

16. The machine-readable medium of claim 15, wherein calculating the backend resource cost for the record comprises performing operations comprising:
for each system in the list of systems:
retrieving the backend resource cost per request;
identifying a number of times the system is used in filling the request;
calculating a system cost for the record by multiplying the backend resource cost per request and the number of times the system is used in filling the request; and accumulating the system cost.

17. The machine-readable medium of claim 15, wherein the backend resource cost comprises at least one of:
a monetary cost;
a CPU utilization cost;
a memory utilization cost;
an I/O utilization cost;
a bandwidth utilization cost; and
a storage utilization cost.

18. The machine-readable medium of claim 15, wherein the selected at least one dimension comprises one or more of:
the service;
a region representing a source of the request;
a traffic type;
a user type; and
a language.

* * * * *